United States Patent [19]

Richgels

[11] Patent Number: 5,033,039
[45] Date of Patent: Jul. 16, 1991

[54] POSITIONING SYSTEM FOR FLEXURE MOUNTED READ/WRITE HEAD

[75] Inventor: Jerome F. Richgels, San Jose, Calif.

[73] Assignee: Literal Corporation, Colorado Springs, Colo.

[21] Appl. No.: 387,914

[22] Filed: Jul. 31, 1989

[51] Int. Cl.⁵ .................... G11B 21/08; G11B 5/54
[52] U.S. Cl. .................... 369/43; 360/77.04; 360/78.04
[58] Field of Search ............... 369/32, 43, 215, 44.16, 369/44.28, 44.29, 44.35, 44.36; 360/74.04, 78.07, 78.04, 78.06, 77.06, 77.02; 318/561

[56] References Cited

U.S. PATENT DOCUMENTS

| | | | |
|---|---|---|---|
| 4,547,822 | 10/1985 | Brown | 360/78.06 |
| 4,748,393 | 5/1988 | Fincher et al. | 360/78.04 |
| 4,899,234 | 2/1990 | Genheimer | 360/78.07 |
| 4,907,109 | 3/1990 | Senio | 360/78.07 |
| 4,908,816 | 3/1990 | Champagne et al. | 369/219 |
| 4,933,785 | 6/1990 | Morehouse et al. | 360/77.02 |
| 4,949,201 | 8/1990 | Abed | 360/78.07 |

Primary Examiner—Donald McElheny, Jr.
Attorney, Agent, or Firm—Kinney & Lange

[57] ABSTRACT

A random access information storage disk drive system of the optical or magneto-optical type with the read/write head mounted between parallel flexures for suspension in a linear actuator motor. Dynamic spring force compensation is provided incrementally as the head is moved radially inward and outward of the at-rest position of the flexures to compensation for the increasing restoring force exerted by the flexures as the head is moved towards the extremes of its tracking path.

2 Claims, 6 Drawing Sheets

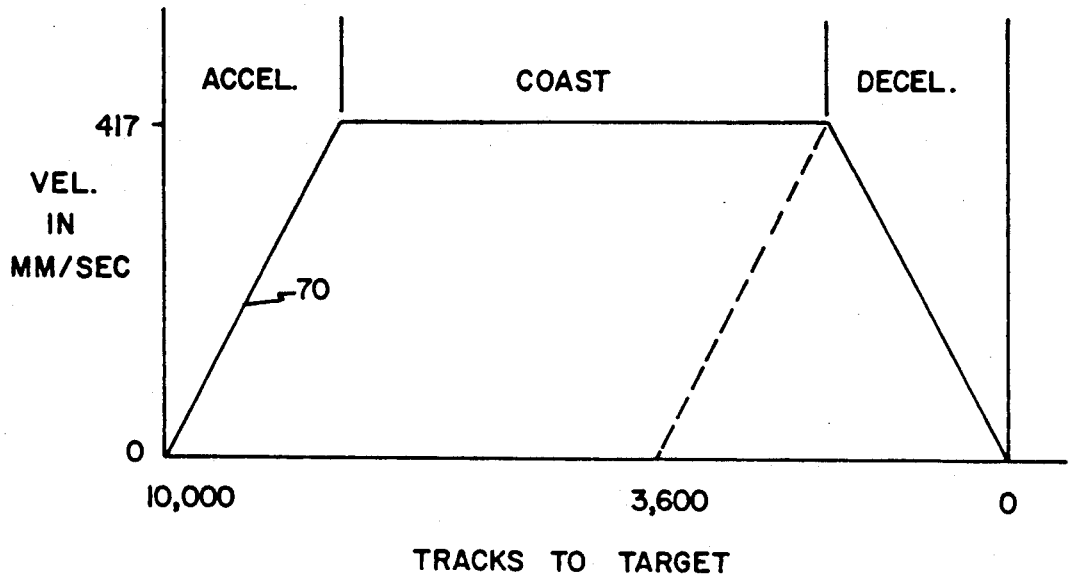
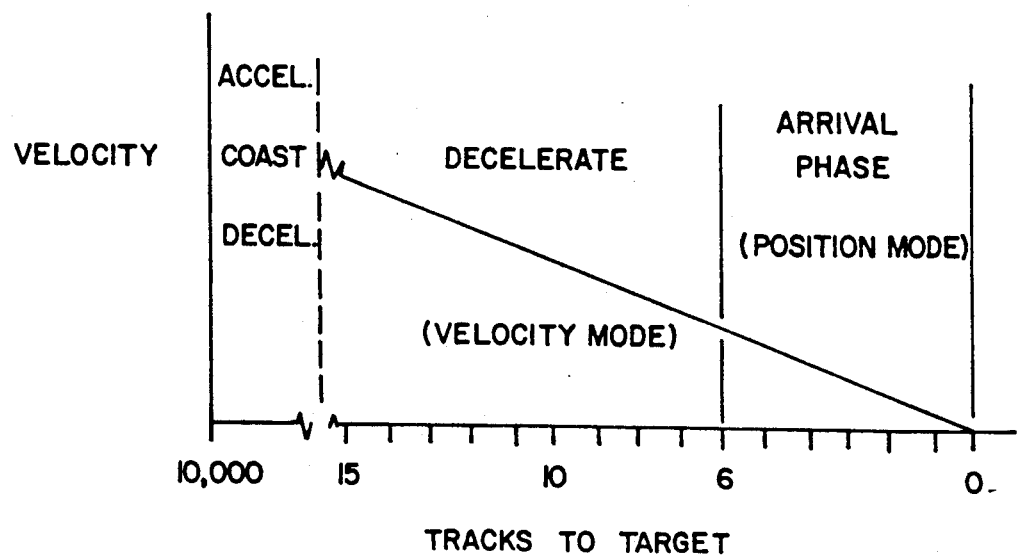

POSITIONING SYSTEM FOR FLEXURE MOUNTED READ/WRITE HEAD

FIELD OF THE INVENTION

The present invention relates to a read/write head positioning system for random access information storage disk drive systems of the type in which the read/write head is mounted on flexure supports.

BACKGROUND OF THE INVENTION

In random access information storage systems, a read/write head must be moved periodically and reliably in track seek operations between spaced apart data tracks on the storage disk to access desired information sectors randomly located on the disk tracks. Various servo control systems are known for controlling the acceleration and deceleration of the head during the track seek operation. Ideally, movement of the head is controlled in such a manner that it arrives over the target track at the end of track seek with zero velocity. At this time, control over movement of the head is handed off from the track seek servo control circuit to the track follower servo control circuit to maintain the track sensor located in the head centered on the desired track during read or write operation.

Various forms of tracking actuators are known to provide reasonably fast access time and good tracking control in magnetic disk drives of the aforementioned type. In a typical arrangement, the carriage for the read/write heads is mounted with ball bearing rollers on a pair of tracks, or races, and the carriage is driven by a stepper motor or voice coil motor to translate the head linearly in a radial direction over the data tracks formed on the surface of the recording disk. This arrangement has the advantage of providing a true linear tracking axis but has the disadvantage of imposing roller bearing irregularities that are not compatible with the extremely small, precise motions that are encountered in optical and magneto-optical drives.

There has recently been developed a tracking actuator system in which the read/write head is mounted between parallel elongated leaf springs, or flexures, to provide friction-free suspension that avoids the problems of track mounted actuators. A flexure-mounted head also offers the advantage of providing single stage tracking actuator operation in which the actuator motor servo controls provide both track seek and track following mode of operation thus simplifying the design of the objective lens actuator by limiting it to a single axis for focus control only. Such a single stage tracking actuator system is disclosed and claimed in copending application Ser. No. 287,801 assigned to the assignee of the present application.

Although advantageous for use in a single stage tracking actuator, particularly in optical and magneto-optical drives, a flexure mounted head presents certain problems with respect to the servo control employed in track seek and track following control modes of operation. Preferably, the head is mounted on the flexure ends such that when the flexures are in their at-rest (unflexed) condition, the head is positioned radially in the center of the band of data to be scanned by the head. Then as the head is scanned away from this at-rest position, the force required to move the head and hold it in position over the data track of interest increases as a function of the degree to which the flexures are bent away from their at rest position.

It is therefore an object of the present invention to provide a positioning system and method for a flexure mounted head actuator in a random access information storage disk drive system that compensates for the increasing restoring force of the flexures as the head is scanned away from its central, at-rest position.

SUMMARY OF THE INVENTION

Thus, in accordance with the invention, a head positioning actuator system for a random access information storage disk drive system is provided which comprises a data read and/or write head, a linear motor actuator for moving the head radially of data tracks on an information storage disk and flexure means for supporting the head in the linear motor actuator such that movement of the head over the data tracks flexes the flexure means creating a restoring force tending to return the head to an at-rest position of the flexure means. Servo control means are also provided for generating actuator signals applied to the actuator to cause the head to move across the data tracks in a track seek operating mode and to hold the head centered on a data track of interest in a track following operating mode. According to a particular feature of the invention, the servo control means includes means for generating force compensating signals which are used in the servo control means to modify the actuator signals by adding an additional actuator force to counteract the restoring force exerted by the flexure means when the head is moved by the actuator signals away from the at-rest position of the flexure means.

BRIEF DESCRIPTION OF THE DRAWINGS

In the drawings:

FIGS. 3a and 3b are graphs illustrating the velocity seek profile useful in explaining the operation of the FIG. 2 servo system.

DETAILED DESCRIPTION

Figure 1:
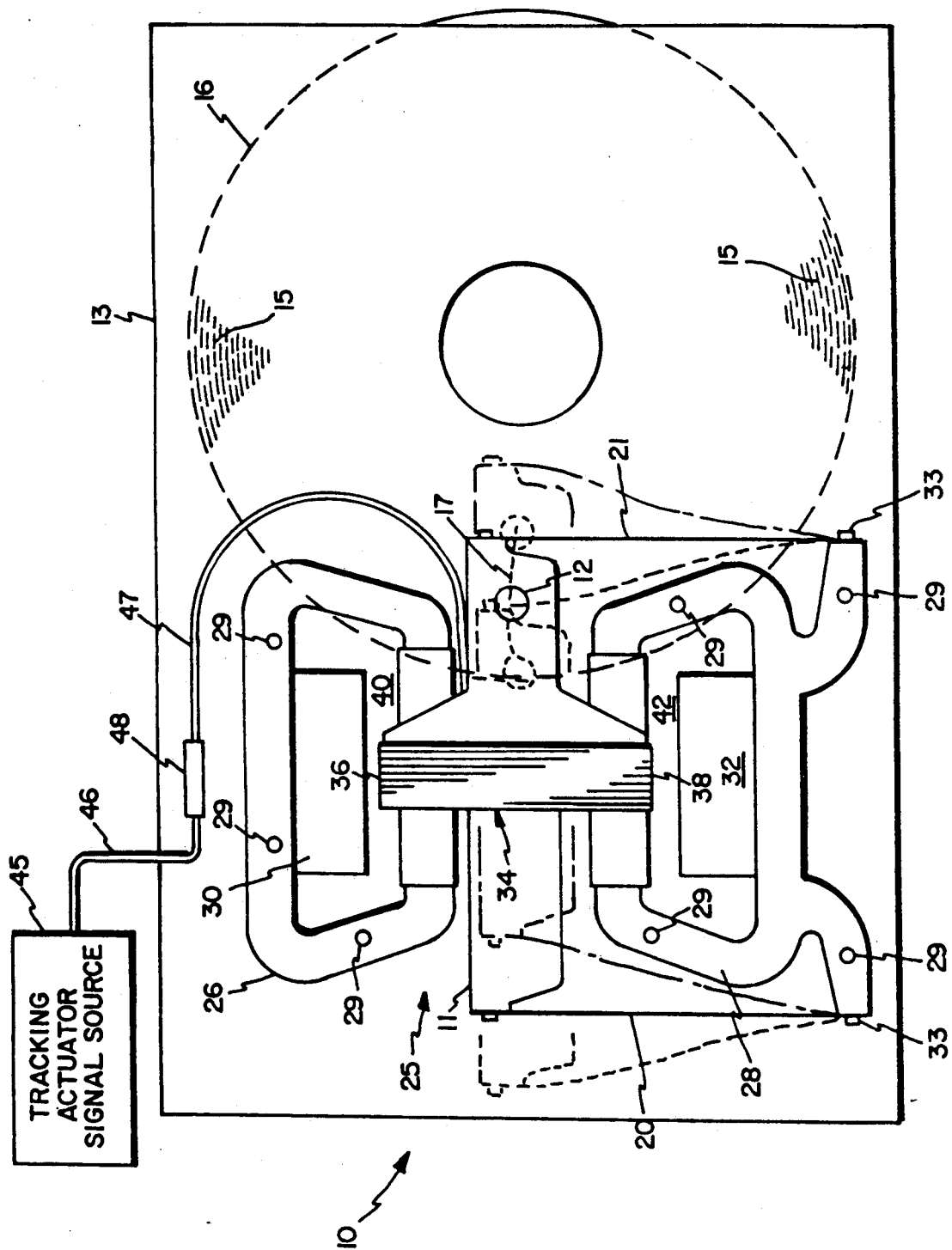
FIG. 1 is a bottom plan view showing tracking actuator apparatus with a flexure-mounted read/write head of the type for which the present invention intended.

Before considering the head positioning system of the present invention, there will be described single stage tracking actuator apparatus of the type for which the present invention is intended. In FIG. 1, the single stage tracking actuator apparatus 10 comprises a read and/or write head 11 which carries optical components for generating a laser beam focused by objective lens 12 through an aperture (not shown) in a mount plate 13 onto data tracks 15 of a magneto-optical disk 16.

Head 11 is supported between a pair of parallel, elongated leaf springs for translatable movement along a tracking path 17. Springs 20,21 comprise flexure means for supporting head ten in position in a linear motor actuator 25 comprised of a pair of poles 26,28, a pair of permanent magnets 30,32 and an elongated drive coil 34 attached to head 11 and having end turn segments 36,38 positioned in the magnetic flux gaps 40,42 existing between pole pieces 26,28 and their respective magnets 30,32. Pole pieces 26 and 28 are secured to the underside of mount plate 13 by suitable means such as screws 29. The motor ends of leaf springs 20 and 21 are attached to head 11 by suitable means such as screws 31 while the ends thereof remote from head 11 are are similarly attached by screws 33 to arms 28a,28b of pole piece 28. Tracking actuator drive signals are supplied from actuator drive circuits 45, described more fully later, to actuator drive coil 34 via input ribbon cable 46 and connector connector 48. The structural details of the tracking actuator apparatus 10 are described more fully in the aforementioned copending application Ser. No. 287,801 the disclosure of which is incorporated herein by reference.

A particular advantage of the tracking actuator 10 employing a flexure mounted head is that it provides a smooth, friction-free translatable suspension that enables fast access times by a relatively large mass optical head without encountering the difficulties associated with mechanical roller bearing suspensions. An inherent disadvantage that results, however, lies in the fact that as the head 11 is driven radially inward or outward from the at-rest position shown in solid line toward the extreme positions shown in the drawing, the leaf spring flexures exert a restoring force tending to drive the head back to the at-rest position. Such restoring force increases as the head 11 is driven outward in either direction to its extreme end positions.

Figure 2:
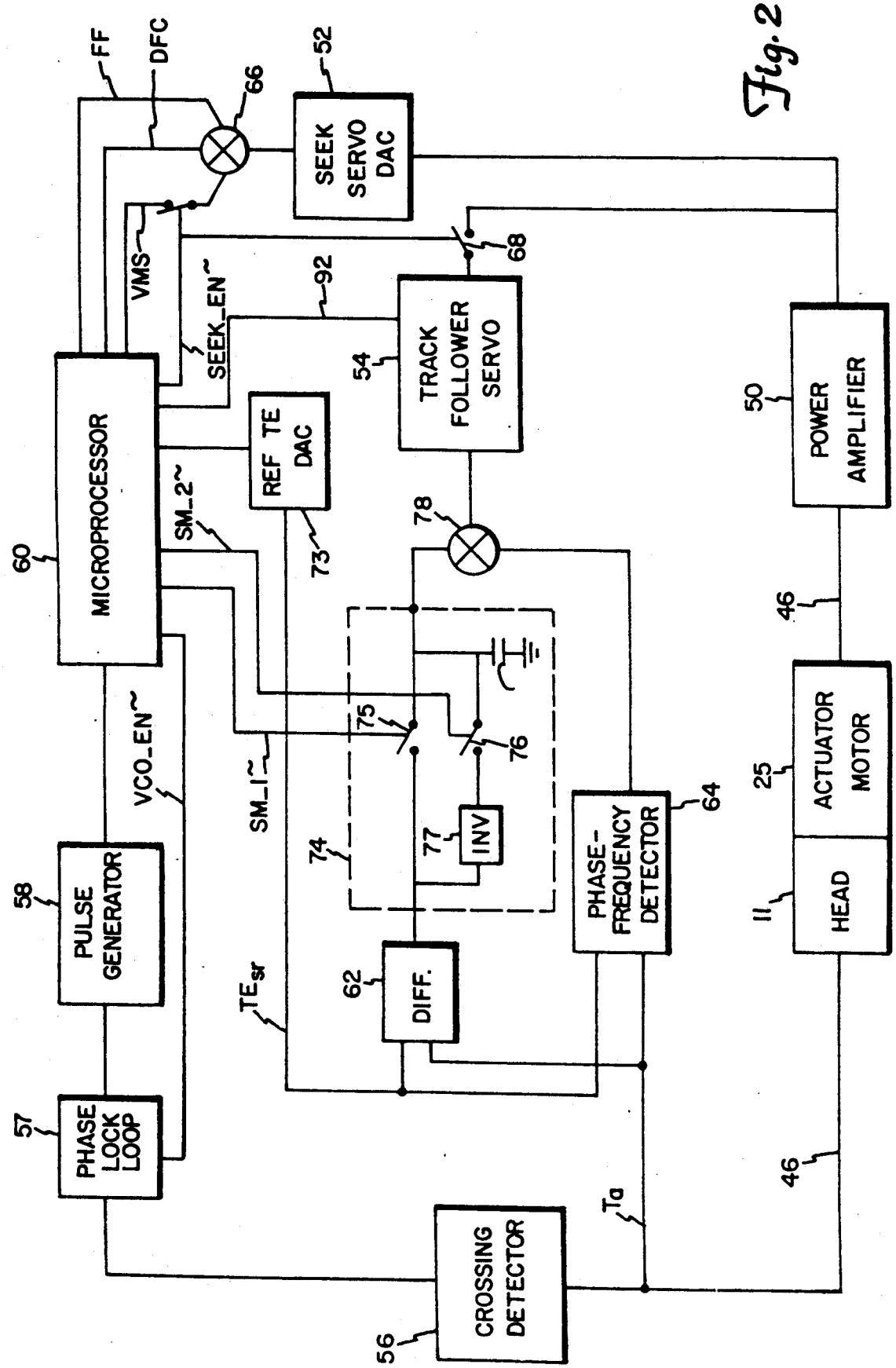
FIG. 2 is a partly schematic block diagram of a tracking actuator head positioning servo system embodying the present invention.

Referring now to FIG. 2, the tracking actuator signal source 45, comprising a head positioning servo control system, is shown in greater detail. In FIG. 2, the boxes labeled head 11 and actuator motor 25 correspond to the similarly numbered head and actuator motor components of FIG. 1. The driving current for actuator motor 25 is provided via electrical connections in ribbon cable 46 from a power amplifier 50 which derives its control input from seek servo digital-to-analog converter (DAC) 52 and tracking servo 54. The contribution of DAC 52 and/or servo 54 to the control of the positioning of head 11 depends on the function being performed at any given time, i.e. track seek or track following.

Included in head 11 is conventional sensing means for generating an actual tracking error signal in well known manner from transitions between concentric data grooves and intermediate land areas on the storage disk, the tracking error signal being representative of actual movement of the head relative to the data tracks. This actual tracking error signal is coupled by electrical connections in cable 46 to the input of zero crossing detector circuit 56 which is conditioned by a DIR_IN~ logic control signal from microprocessor 60 during normal track seek operation according to the direction in which the seek is occurring to produce an output pulse each time the optical sensor in head 11 crosses a land between data tracks on the storage disk. The actual tracking error signal derived in head 11 is also applied to the inputs of a difference circuit 62 and a phase-frequency detector circuit 64 for reasons which will be discussed later.

The pulse train output of zero crossing detector 56 may have gaps in the train resulting from corruption of the actual tracking error signal caused by disk surface imperfections or the head passing over mirror areas on the disk which temporarily prevents the tracking error signal sensor in the head from reliably indicating true transitions between data grooves and land areas. To compensate for this, the output pulse train from detector 56 is applied to the input of a phase lock loop circuit 57 which is enabled during track seek by a logic signal VCO_EN~ from microprocessor 60 to generate a sawtooth ramp function at a frequency which is locked in phase with the fundamental frequency of the pulse train from zero crossing detector 56. The output of PLL 57 is applied to pulse generator 58 which converts the sawtooth ramp function signal to a continuous train of pulses representative of land crossings and comprising a reference, as opposed to actual, tracking error signal which is then coupled to the drive controller microprocessor 60. As is well known in electronic servo control systems, PLL 57 functions in the nature of an electronic flywheel to continue the production of land crossing output pulses from generator 58 even when input pulses to PLL 57 are temporarily missing from the output of zero crossing detector 56. The pulse train from generator 58 is applied to microprocessor 60 to control an event counter and an interval timer in a manner to be described.

As needed during seek operations, feed forward (FF) head acceleration and deceleration digital drive values are generated in microprocessor 60 and applied via combining circuit 66 to seek servo DAC 52 where they are converted to analog voltage signals for application to the input of power amplifier 12 to generate predetermined acceleration and deceleration drive currents for actuator motor 25. In an actually constructed embodiment, acceleration and deceleration values of +3 g and −3 g are used although it will be appreciated that the values are a matter of known choice dependent on the drive system parameters. A digital velocity mode seek (VMS) error value is generated in microprocessor 60 in response to feedback information in the reference tracking error pulse train from generator 28. This VMS error value is applied via solid state switch 33 to another input of combining circuit 66 to modify the feed forward acceleration value, as needed, to maintain the velocity of head 11 during velocity mode seek within a desired range to conform to a predetermined velocity profile stored in microprocessor 30, an example of which is illustrated in FIG. 2.

In addition, and in accordance with a feature of the invention, a dynamic spring force compensation value is generated from a lookup table in microprocessor 60 and applied to combining circuit 66. The resultant output value from combining circuit 66 is converted in DAC 52 to an analog voltage used to generate the desired driving current in power amplifier 12 for use by actuator motor 25 in controlling the movement of head 11. Control signals SEEK_EN~ and VCO_EN~ generated at appropriate times in microprocessor 60 are applied, respectively, to a solid state switch 67 and to a voltage controlled oscillator in PLL 57 to enable operation of the velocity mode feedback loop as just described and to disable the velocity mode loop when the seek servo switches to the position mode seek as the head approaches the target track at the end of the seek operation. The SEEK_EN~ signal is also applied to close solid state switch 68 to enable the track follower operating mode when the velocity mode seek is completed.

As thus far described, the seek servo system of FIG. 1 is operative in a velocity mode seek during long track seeks of, for example, 256 tracks or more, to move head 11 rapidly across the data tracks at different velocities generally following the exemplary velocity profile illustrated in FIG. 3a. As is typical in track seek operations, the seek velocity profile is initiated with a constant acceleration phase corresponding to linearly increasing velocity segment 70 and ends with a constant negative acceleration (deceleration) phase corresponding to linearly decreasing velocity segment 72. For seeks greater than some intermediate number, such as 3600 tracks, the acceleration drive current is reduced to zero when the head reaches a predetermined terminal velocity, e.g. 417 mm/sec, and the head is allowed to coast with a generally constant velocity during this coast phase as represented by segment 71 of the FIG. 3a profile. The acceleration and deceleration drive currents used to achieve the linearly increasing and decreasing velocity profiles of segments 70 and 72 are determined by the aforementioned feed forward (FF) values generated in microprocessor 60.

In order to provide a degree of control over the drive of head 11 to assure that it is following the desired velocity profile, at least within an acceptable range of deviation, the servo loop, comprised of zero crossing detector 56, PLL 57, pulse generator 58, microprocessor 60 and seek servo DAC 52, employs a pseudo-sampled form of velocity feedback, meaning that the actual velocity information derived in microprocessor 60 from the reference tracking error signal at the output of pulse generator 58 is not continuous. With this pseudo-sampled velocity feedback, actual velocity is determined by measuring the time interval between track crossings while the head is moving across the disk surface, as represented by the period between pulses from pulse generator 58.

Figure 4:
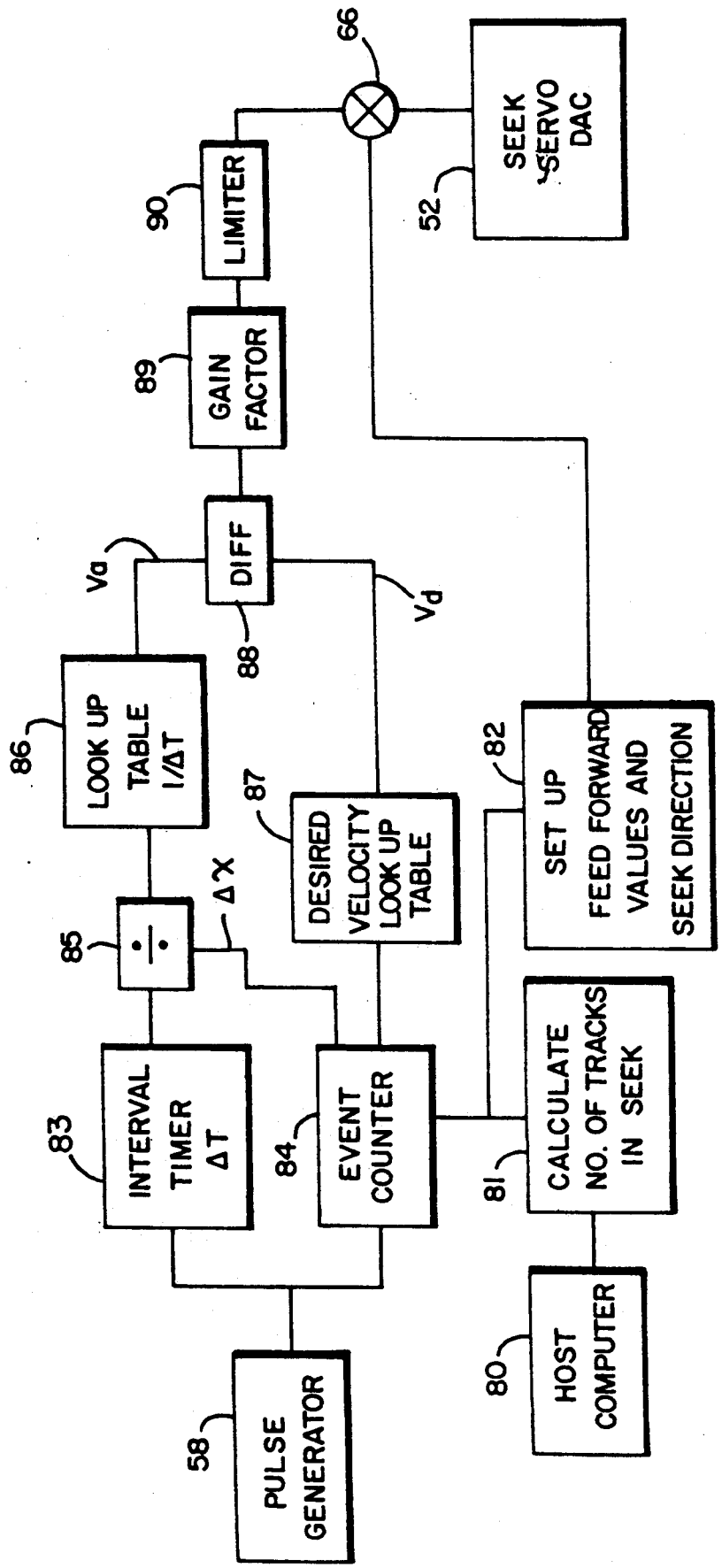
FIG. 4 is a schematic representation of the velocity seek algorithm performed in the microprocessor of the FIG. 2 servo system.

Referring to FIG. 4, there is shown in schematic form the algorithm performed in microprocessor 60 for developing the pseudo-sampled velocity feedback information. In a typical seek operation, the desired target track address supplied from the host computer, not shown, is used at 81 to calculate the difference between the current track and the target track to determine the number of tracks involved in the seek. The target track address is also used to determine the direction of the seek, i.e. radially inward or outward of the center of the disk which is represented by logic control signal DIR_IN~. With this information, the microprocessor sets up the acceleration and deceleration feed forward values which are stored in registers in the microprocessor before any head movement begins.

Due primarily to the fact that the phase lock loop circuit 57 requires a minimum number of input zero crossing pulses from detector 56 to phase lock onto the pulses, microprocessor 60 determines if the seek is greater than a predetermined minimum number of tracks, e.g. 256 tracks in an actually constructed embodiment, and, assuming it is, outputs the digital FF value of acceleration via combining circuit 66 to seek servo DAC 52 to start the head moving.

At the beginning of the seek, interval timer 83 is started and event counter 84 is enabled. Counter 84 has been initially loaded by 81 with a negative count corresponding to the number of tracks to go in the seek and, once enabled, is incremented each time a land crossing pulse is received from pulse generator 58. Consequently, event counter 84 keeps a running tally of the number of tracks left to go to the target track as the head moves across the disk surface. When the counter overflows (reaches a count of zero), the head has reached the target track.

At the beginning of each microprocessor sample, after the head movement has commenced, a land crossing pulse from pulse generator 58 causes interval timer 83 to be read, the reading stored away and the timer reset to 0 to begin timing for the next sample. At the same time, the incoming land crossing pulse from generator 58 causes the event counter 84 to be read and subtracted from the previous event counter value to get a $\Delta x$ value representing the number of tracks crossed since the last sample. The interval timer value $\Delta T$ is then divided at 85 by $\Delta x$ to get the time interval for one track crossing 1 $\Delta T$. This value is used to access the actual velocity lookup table 86 which returns a scaled value $V_a$ representing the sampled actual velocity of head 11.

The new difference value residing in event counter 84 representing the number of tracks to go to target is used to access the desired velocity lookup table 87 which returns a scaled value $V_d$ representing the desired velocity value for that particular difference to the target track. The lookup table used for this purpose may be conventionally generated by using the known square root switching curve:

$$V_d = \sqrt{2A(X_f - X_s)}$$

where:
 $V_d$ = desired velocity
 A = acceleration
 $X_f$ = current track
 $X_s$ = target track
 X is in millimeters The actual velocity value from lookup table 86 is then subtracted at 88 from the desired velocity value from lookup table 82 to get the preliminary velocity error. The result is multiplied by a predetermined gain factor at 89. The magnitude of this velocity error value is then clamped by the limiter 90, and is output to servo DAC 52 where the computed digital value is converted to an analog voltage for application to power amplifier 50 which, in turn, generates the corresponding driving current for actuator 25, all in known manner.

After all calculations are made, the operation of microprocessor 60 returns to the beginning of the velocity mode calculation loop and waits for the next land crossing pulse from pulse generator 58. This process iterates continuously until the end of the velocity mode and the beginning of what may be referred to as the "arrival phase" at which time the system switches to a position mode of operation. More specifically, near the end of the deceleration phase, when the land crossing pulse for track n−6 is received, i.e. 6 tracks to go to target, the microprocessor 60 terminates velocity mode operation and switches to position mode operation for the arrival phase of the track seek operation.

Figure 5:
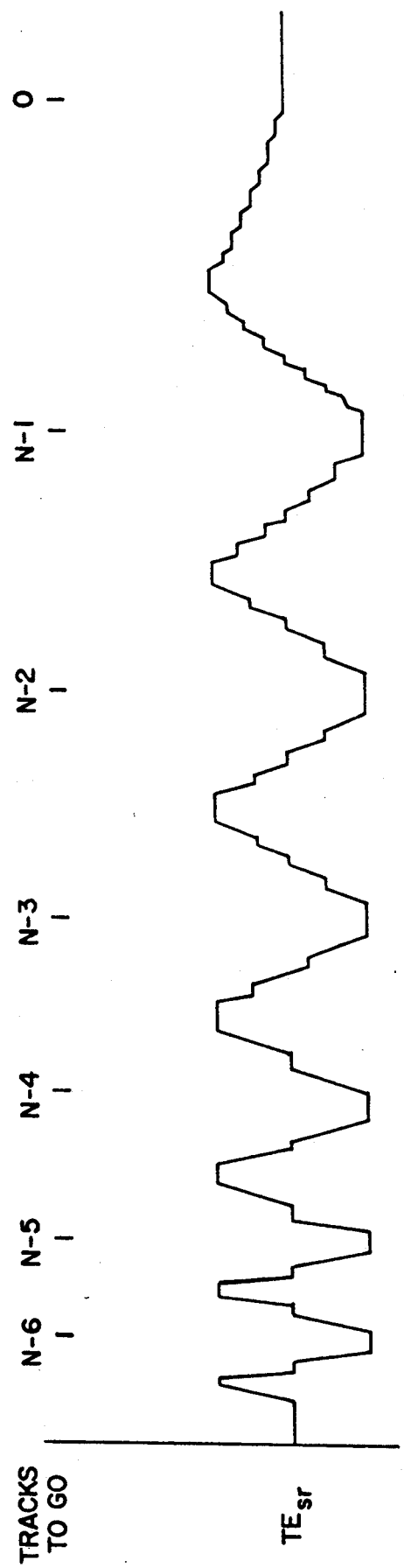
FIG. 5 is a graph of signal waveforms at various points in the servo system of FIG. 2 which is useful in explaining the operation thereof.

Referring again to FIG. 1 there will now be considered that portion of the drive servo control system which is effective to provide position mode seek control of head 11 during either the arrival phase at the end of a long seek, as illustrated in FIG. 3b, or throughout the entirety of a short seek, i.e. a seek less than a predetermined number of tracks, e.g. 256 tracks in an actual embodiment. For the purpose of this position mode seek control, the actual tracking error signal from head 11 is applied simultaneously to respective first inputs of difference circuit 62 and phase-frequency detector circuit 64. A reference tracking error signal, $TE_{sr}$ in FIG. 5, is synthesized from digital values generated in microprocessor 60 and converted to an analog signal by reference tracking error DAC 73. The synthesized reference tracking error signal corresponds in frequency and phase to a tracking error signal which would be generated by tracking error sensing means in head 11 if the head were moving in a desired profile of position versus time across a predetermined number of tracks on the storage disk. Preferably the reference tracking error signal includes at least one segment of monotonically decreasing frequency representing a desired slowing of head movement across a contiguous series of tracks adjacent the target track at the end of a seek operation, as would be the case at the end of a long seek operation.

This reference tracking error signal is applied simultaneously to respective second inputs of difference circuit 62 and phase-frequency detector 64. The applied actual and synthetic reference tracking error signals are then differenced in circuit 62 and the resultant output applied to a synchronous demodulator 74 wherein there is generated a first position error signal representative of any deviation in actual position of head 11 from the desired position represented by the reference tracking error signal $TE_{sr}$. In synchronous demodulator 74, the output of difference circuit 62 is applied directly to a solid state switch 75 and, in parallel, through an inverter circuit 77 to solid state switch 76. Timed switching signals SM_1~ and SM_2~ are generated in microprocessor 60 and coupled to switches 75 and 76, respectively, to generate a dc error voltage with a polarity dependent on the direction of phase error between the actual and reference tracking error signals.

Simultaneously, phase-frequency detector 64 is responsive to the reference and tracking error signals at its inputs to generate a second position error signal representative of deviation in actual position of head 11 from the desired position as represented by the reference tracking error signal. The outputs of synchronous demodulator 74 and phase-frequency detector 64 are combined in adder circuit 78 and coupled to the input of conventional tracking servo circuit 54 to provide a closed loop feedback which locks the moving position of head 11 to the desired position represented by the reference tracking error signal generated by microprocessor 60 and reference tracking error DAC 73.

For a short seek operation, e.g. less than 256 tracks, the operation of the seek servo system is the same as just described for the position mode operation during the arrival phase of a long seek, except that the reference tracking error signal corresponds in frequency and phase to the complete profile, similar to that of FIG. 2, of head acceleration and deceleration and an optional coast segment throughout the entire seek operation. Thus at the beginning of position mode seek, a positive acceleration feed forward drive current of appropriate polarity is applied via servo DAC 52 to amplifier 50 and actuator motor 25. At the same time, microprocessor 60 outputs a synthesized tracking error signal that corresponds to desired movement of the head 11 across the tracks at a linearly increasing velocity that would result from the applied positive acceleration current. In the present embodiment, the synthesized reference tracking error signal begins with a swept burst at an increasing frequency of from 4 KHz to 12 KHz for a period of 6 tracks, the exact opposite of decreasing frequency burst $TE_{sr}$ in FIG. 5 employed in the aforedescribed arrival seek phase. At the end of the sixth track, and assuming the seek is greater than twelve tracks, the feed forward acceleration current is reduced to zero and the frequency of the synthesized reference tracking error signal is held constant at 12 KHz for the coast phase of the seek corresponding to a predetermined constant head velocity, e.g. 22 mm/sec. This continues until microprocessor 60 determines that track n−6 has been reached at which time the synthesized reference tracking error signal enters the arrival phase with a swept decreasing frequency exactly as described above in connection with the arrival phase of a long seek. Throughout the position mode seek, the actual tracking error signal is maintained locked to the reference tracking error signal (and thus also the movement of head 11) by the position mode feedback loop including synchronous demodulator 74 and phase-frequency detector 64. If the seek is fewer than 12 tracks, the coast phase is eliminated and a lower terminal frequency is reached by the reference tracking error signal at the seek midpoint, at which time the deceleration phase is initiated to bring head 11 to the target track at the desired zero velocity.

Figure 6:
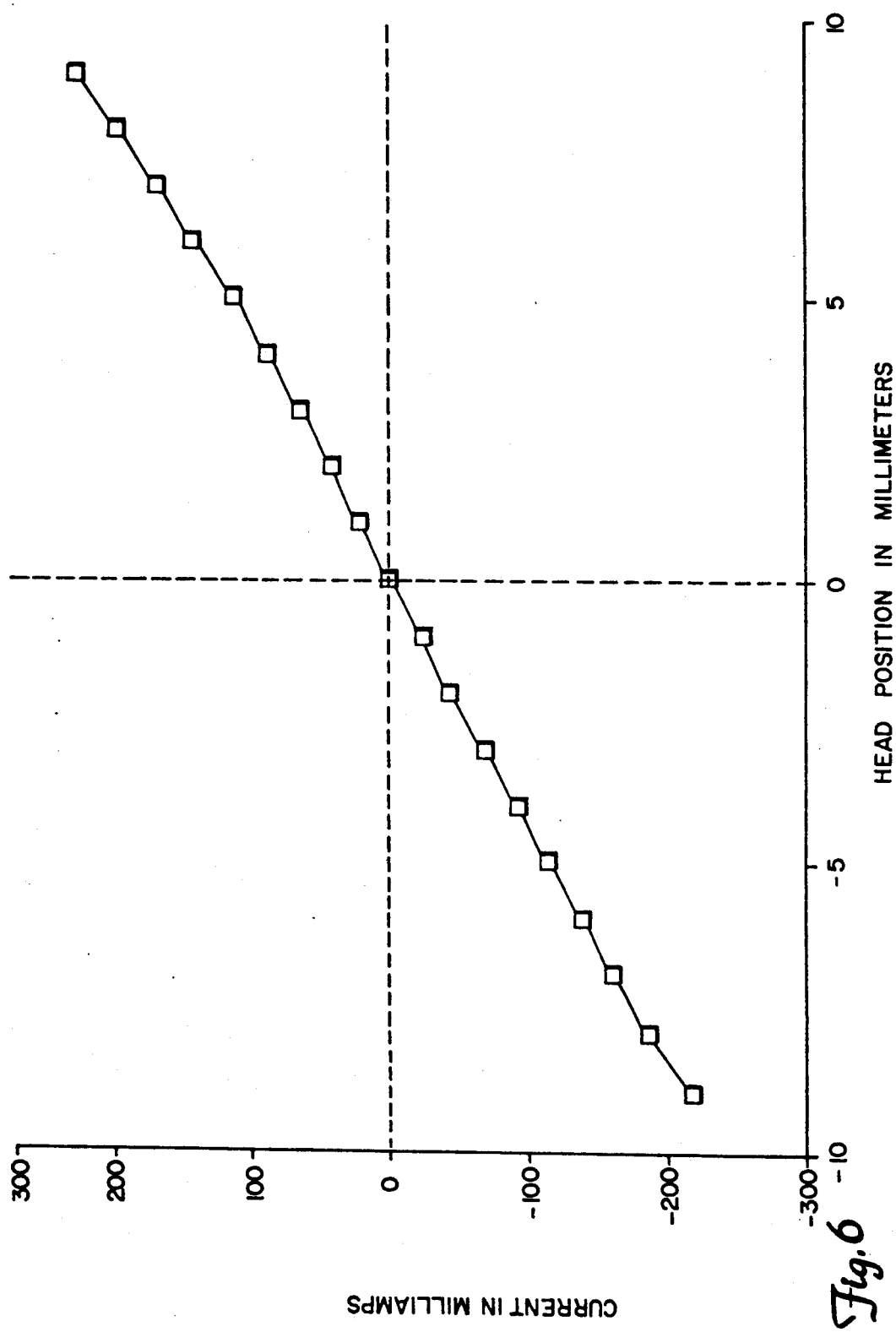
FIG. 6 is a graph of spring force compensation values useful in accordance with the present invention in the servo system of FIG. 2.

It will be appreciated that whenever head 11 is moved radially inward or outward away from the at-rest position of flexure leaf springs 20,21 shown in solid line in FIG. 1, the leaf springs exert a restoring force tending to force the head back to the at-rest position. To counter this spring restoring force, microprocessor 60 is provided with a lookup table in which is stored a series of values relating the position of the head away from center (at-rest) position to the amount of drive current required to be applied to actuator motor 25 to hold the head in that position. An exemplary graph, for this purpose, of drive current versus head position is shown in FIG. 6. Each time the computer including the system of the present invention is powered up, the microprocessor initiates a routine which calibrates the current versus position values and stores the values in the lookup table in the microprocessor. This is done by driving the head incrementally through deflected positions along the tracking path and sensing the current required to hold the head at each of the positions. A convenient sensing point for this purpose is the integrator voltage in the track follower servo loop which is fed by line 92 to microprocessor 60. These values are then converted to corresponding digital values for storage in the lookup table in the microprocessor.

Having thus developed the force compensation table tailored to the particular drive characteristics, microprocessor 60 determines the head position from the track number and applies the corresponding compensation value from the lookup table and applies it via the line labeled DFC to combining circuit 66 and seek servo DAC 52 for conversion to the appropriate analog driving current applied to actuator motor 25.

During track seeks greater than a predetermined minimum number of tracks to target, the spring force compensation is checked after each velocity calculation and is updated periodically as the head moves a predetermined increment of tracks. In an actual embodiment, spring force compensation is checked for track seeks greater than 64 tracks to target and the compensation value is updated on line DFC every 128 tracks traversed by the head. When tracking is first initialized. A spring force address register in microprocessor 60 is initialized to contain the midpoint address of the head position, i.e. the at-rest position of the flexures. During seek, this register is incremented or decremented, depending on which direction the head is traveling, and the spring force address is used to access the lookup table which returns the proper spring force compensation value for that particular radial position. As a consequence of this incrementally changing force compensation, the stress on the track seek and track following servo loops is substantially reduced.

The invention has been described in detail with particular reference to a presently preferred embodiment, but it will be understood that variations and modifications can be effected within the spirit and scope of the invention.

What is claimed is:

1. Head positioning actuator system for a random access information storage disk drive system, the actuator system comprising:
   a data read and/or write head;
   a linear motor actuator for moving said head radially of data tracks on an information storage disk;
   flexure means for supporting said head in the linear motor actuator such that movement of said head over the data tracks flexes said flexure means creating a restoring force tending to return the head to an at-rest position of the flexure means;
   servo control means for generating an actuator signal applied to said actuator to cause said head to move across said data tracks in a track seek mode and to hold said head centered on a data track of interest in a track following mode;
   said servo control means including means for generating a force compensating signal used to modify the actuator signal by adding an additional actuator force to counteract the restoring force exerted by the flexure means when said head is moved by the actuator signals away from the at-rest position of the flexure means; in which the force compensating signal varies as a function of distance of the head from the at-rest position; and in which said means for generating a force compensating signal includes means for updating the force compensating signal during the track seek mode each time said head is moved over a predetermined number of data tracks on said information storage disk.

2. Head positioning actuator system of claim 1 in which said means for generating a force compensating signal includes a lookup table of actuator motor drive current versus head position that is recalibrated each time power is applied to said disk drive system.

* * * * *